(12) United States Patent
Taniguchi et al.

(10) Patent No.: US 10,724,392 B2
(45) Date of Patent: Jul. 28, 2020

(54) SEAL MEMBER (71) Applicant: MITSUBISHI HITACHI POWER SYSTEMS, LTD., Kanagawa (JP)

(72) Inventors: Kenta Taniguchi, Yokohama (JP); Kenji Sato, Yokohama (JP)

(73) Assignee: MITSUBISHI HITACHI POWER SYSTEMS, LTD., Kanagawa (JP)

(*) Notice: Subject to any disclaimer, the term of this patent is extended or adjusted under 35 U.S.C. 154(b) by 243 days.

(21) Appl. No.: 15/512,760

(22) PCT Filed: Sep. 8, 2015

(86) PCT No.: PCT/JP2015/075439
§ 371 (c)(1),
(2) Date: Mar. 20, 2017

(87) PCT Pub. No.: WO2016/047432
PCT Pub. Date: Mar. 31, 2016

(65) Prior Publication Data
US 2017/0292397 A1    Oct. 12, 2017

(30) Foreign Application Priority Data

Sep. 26, 2014   (JP) ................................. 2014-196772

(51) Int. Cl.
*F01D 11/00*   (2006.01)
*F01D 25/12*   (2006.01)
(Continued)

(52) U.S. Cl.
CPC ............ *F01D 11/008* (2013.01); *F01D 9/023* (2013.01); *F01D 11/005* (2013.01); *F01D 25/12* (2013.01);
(Continued)

(58) Field of Classification Search
None
See application file for complete search history.

(56) References Cited

U.S. PATENT DOCUMENTS 4,502,809 A * 3/1985 Geary ..................... F01D 25/26
403/28
6,675,584 B1   1/2004 Hollis et al.
(Continued)

FOREIGN PATENT DOCUMENTS

CN          1519464       8/2004
JP       2000-257862      9/2000
(Continued)

OTHER PUBLICATIONS

International Search Report dated Dec. 22, 2015 in corresponding International (PCT) Application No. PCT/JP2015/075439.
(Continued)

*Primary Examiner* — Christopher Verdier
*Assistant Examiner* — Jason A Fountain
(74) *Attorney, Agent, or Firm* — Wenderoth, Lind & Ponack, L.L.P.

(57) ABSTRACT

A seal member is between a combustor around a rotor axis and a vane on a downstream side in an axial direction and defining a part of a combustion gas flow passage through which combustion gas is configured to flow, the seal member being configured to seal a gap between the combustor and the vane. The seal member has: an end face that faces the downstream side in the axial direction so as to face a lateral end face of the vane facing an upstream side in the axial direction; cooling channels through which cooling air is configured to be discharged from a plurality of openings defined in the end face in an array in a circumferential direction based on the rotor axis; and a clearance forming portion that protrudes further toward the downstream side in
(Continued)

the axial direction than the end face in which the openings are defined.

5 Claims, 8 Drawing Sheets

(51) Int. Cl.
    *F16J 15/16*     (2006.01)
    *F16J 15/447*     (2006.01)
    *F02C 7/18*     (2006.01)
    *F02C 7/28*     (2006.01)
    *F01D 9/02*     (2006.01)

(52) U.S. Cl.
    CPC ............... *F02C 7/18* (2013.01); *F02C 7/28* (2013.01); *F16J 15/162* (2013.01); *F16J 15/4476* (2013.01)

(56) References Cited

U.S. PATENT DOCUMENTS

| | | | | |
|---|---|---|---|---|
| 6,751,962 | B1 * | 6/2004 | Kuwabara | F01D 9/023 60/752 |
| 6,860,108 | B2 * | 3/2005 | Soechting | F01D 9/023 60/39.37 |
| 7,797,948 | B2 * | 9/2010 | Weaver | F01D 9/023 277/399 |
| 2004/0139746 | A1 * | 7/2004 | Soechting | F01D 9/023 60/752 |
| 2008/0236170 | A1 * | 10/2008 | Weaver | F01D 9/023 60/800 |
| 2011/0179798 | A1 | 7/2011 | Pieussergues et al. | |

FOREIGN PATENT DOCUMENTS

| | | |
|---|---|---|
| JP | 2001-289003 | 10/2001 |
| JP | 2004-225688 | 8/2004 |
| JP | 2006-105076 | 4/2006 |
| JP | 4381276 | 12/2009 |
| JP | 2012-505991 | 3/2012 |
| JP | 2013-221455 | 10/2013 |

OTHER PUBLICATIONS

Written Opinion of the International Searching Authority dated Dec. 12, 2015 in corresponding International (PCT) Application No. PCT/JP2015/075439.

\* cited by examiner

SEAL MEMBER

CROSS-REFERENCE TO RELATED APPLICATION

The present application claims priority based on Japanese Patent Application No. 2014-196772 filed on Sep. 26, 2014, the contents of which are incorporated herein by reference.

TECHNICAL FIELD

The present invention relates to a seal member.

BACKGROUND ART

In a gas turbine, air pressurized in a compressor is mixed with fuel in a combustor to generate combustion gas that is a high-temperature fluid, and this combustion gas is introduced into a combustion gas flow passage of a turbine in which vanes and blades are alternately installed. The gas turbine rotates the blades and a rotor by the combustion gas flowing through the combustion gas flow passage. Thus, the gas turbine converts the energy of the combustion gas into rotary energy, so that electricity is taken out from a generator.

A clearance is provided between a transition piece of the combustor and a shroud of a first-stage vane of the turbine to prevent contact therebetween due to thermal elongation. In this clearance, a seal member is provided to prevent cooling air inside a turbine casing from leaking through the clearance into the combustion gas flow passage.

Examples of such a seal member include the transition piece seal disclosed in Japanese Patent Publication No. 2006-105076. This transition piece seal is disposed between a flange of the transition piece and a vane shroud. Each flange extends in a direction away from the combustion gas flow passage.

Technical Problem

However, as the transition piece seal is exposed to the high-temperature combustion gas, it is necessary to cool the transition piece seal with cooling air. On the other hand, cooling channels provided inside the transition piece seal may be blocked as the transition piece seal and the adjacent vane come in contact with each other due to a difference in thermal elongation between the transition piece seal and the vane.

SUMMARY OF INVENTION

The present invention provides a seal member that can be cooled stably without the cooling channels being blocked even in such an event.

Solution to Problem

To solve the above problem, the present invention proposes the following solutions.

According to a first aspect of the present invention, there is provided a seal member that is provided between a combustor disposed around a rotor axis and a vane disposed on the downstream side in an axial direction and defining a part of a combustion gas flow passage through which combustion gas flows, and that seals a gap between the combustor and the vane, the seal member including: an end face that faces the downstream side in the axial direction so as to face a lateral end face of the vane facing the upstream side in the axial direction; cooling channels through which cooling air is discharged from a plurality of openings provided in the end face in an array in a circumferential direction based on the rotor axis; and a clearance forming portion that protrudes further toward the downstream side in the axial direction than the end face in which the openings are formed.

According to this configuration, the clearance forming portion protruding from the end face is provided, so that blockage of the openings can be prevented even when the end face and the lateral end face approach each other. Specifically, the clearance forming portion protrudes further toward the downstream side in the axial direction than the end face in which the openings are formed. Accordingly, even when the clearance between the end face and the lateral end face is reduced, the clearance forming portion comes in contact with the lateral end face before the openings are blocked. As a result, a space on the downstream side of the openings can be stably secured, and the required cooling air can be discharged stably and continuously from the openings even when the clearance between the end face and the lateral end face is reduced. Thus, it is possible to prevent blockage of the openings and stably pass the cooling air through the cooling channels.

A seal member in a second aspect of the present invention is the seal member according to the first aspect, wherein the seal member may be disposed on the outer side of the combustion gas flow passage.

According to this configuration, the seal member can be prevented from directly coming in contact with the high-temperature combustion gas flowing through the combustion gas flow passage. Thus, the seal member is exposed to only part of the combustion gas, so that the seal member can be prevented from reaching an extremely high temperature. Accordingly, the flow rate of the cooling air passed through the cooling channels to cool the seal member can be reduced.

A seal member in a third aspect of the present invention is the seal member according to the first or second aspect, wherein the cooling channels may be formed in a certain region in the circumferential direction including a position on the upstream side in the axial direction at which the cooling channel faces a leading edge of the vane facing the upstream side in the axial direction.

According to this configuration, the combustion gas flowing into the combustion gas flow passage impinges on the vane. Even when the seal member is heated as the combustion gas is entrapped in the vicinity of the leading edge, a certain region including the position corresponding to the leading edge of the vane in the axial direction can be effectively cooled through the cooling channel facing the leading edge of the vane. As a result, the flow rate of the cooling air passed through the cooling channels to cool the seal member can be further reduced.

A seal member in a fourth aspect of the present invention is the seal member according to any one of the first to third aspects, wherein the clearance forming portion may be disposed adjacent to the opening in the circumferential direction.

According to this configuration, the clearance forming portion can be brought in contact with the end face at a position close to the opening. Thus, a space on the downstream side of the openings can be secured with high accuracy by the clearance forming portion. It is therefore possible to prevent blockage of the openings with high accuracy and pass the cooling air through the cooling channels more stably.

A seal member in a fifth aspect of the present invention is the seal member according to any one of the first to fourth aspects, wherein a slit recessed in a radial direction based on the rotor axis may be formed in a region adjacent to the opening.

According to this configuration, the slit can reduce the bending rigidity of the seal member. As a result, the seal member can deflect easily to absorb distortion occurring inside the seal member due to a distribution of thermal stress in the circumferential direction. Thus, distortion of the seal member can be suppressed, and the influence of a temperature difference resulting from cooling can be reduced.

A seal member in a sixth aspect of the present invention is the seal member according to the fifth aspect, wherein the seal member may further include a first engaging part located on the upstream side in the axial direction and connected to the combustor, and a second engaging part located on the downstream side in the axial direction and connected to an annular projection that extends from the lateral end face of the vane toward the upstream side in the axial direction, wherein the second engaging part may have an annular seal surface formed between the second engaging part and the projection; the slit may be recessed in the radial direction from the combustion gas flow passage side; and an end of the slit formed on the outer side relative to the combustion gas flow passage may be disposed at a position closer to the combustion gas flow passage than the position at which the seal surface is formed.

According to this configuration, the position of the end of the slit formed on the outer side relative to the combustion gas flow passage is located closer to the combustion gas flow passage than the seal surface. Thus, it is possible to form the slit while keeping the gap between the seal surface and the projection in a sealed state. It is therefore possible to suppress distortion of the seal member by forming the slit while securing the sealability.

Advantageous Effects of Invention

According to the seal member of the present invention, cooling air can be passed through the seal member without blockage of the openings, so that the seal member can be cooled stably and continuously.

DESCRIPTION OF EMBODIMENTS

First Embodiment

A first embodiment according to the present invention will be described below with reference to FIG. 1 to FIG. 9.

Figure 1:
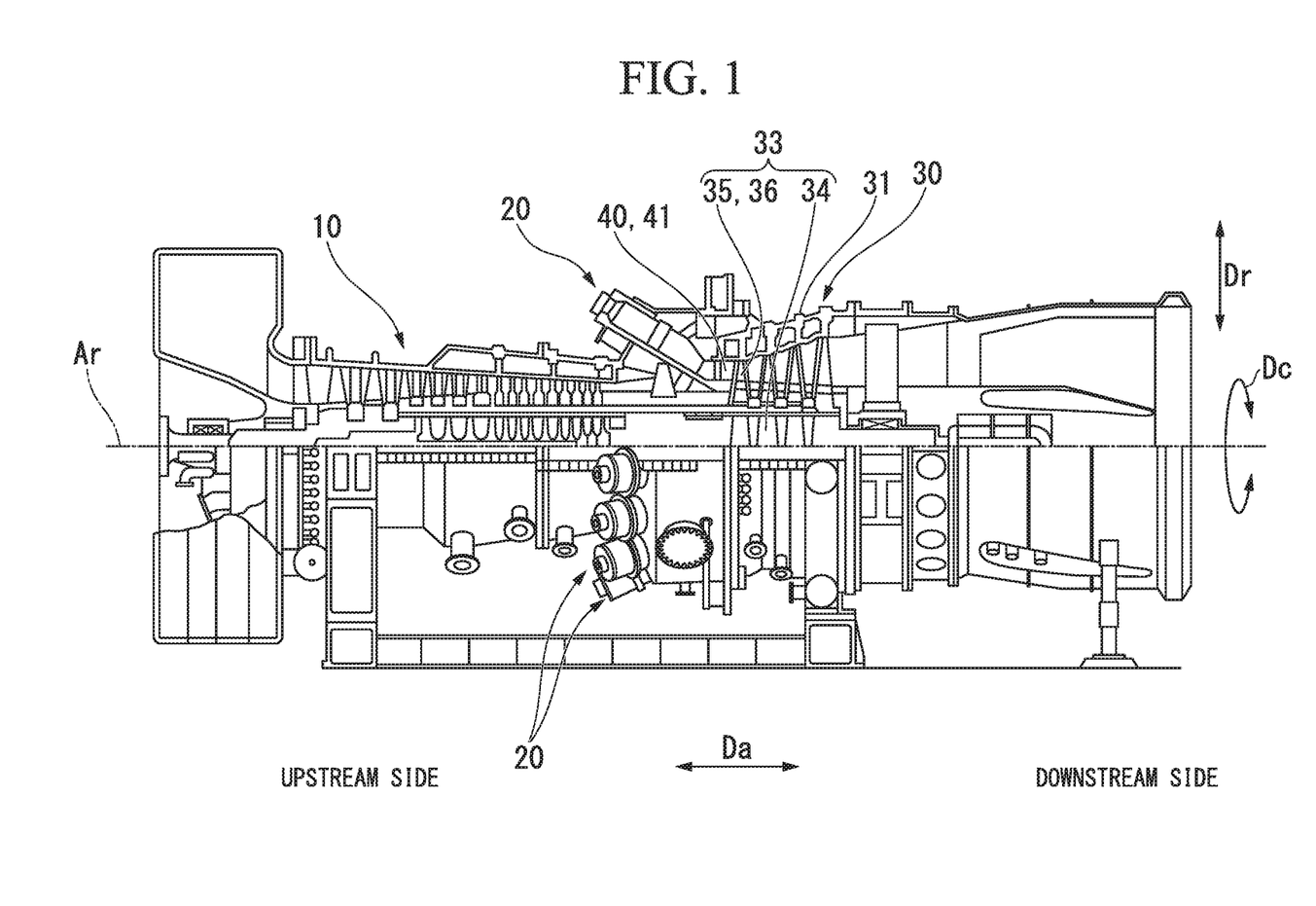
FIG. 1 is a cutaway side view of main parts of a gas turbine in a first embodiment of the present invention.

As shown in FIG. 1, a gas turbine 1 includes a compressor 10 that generates compressed air A by compressing outside air, a plurality of combustors 20 that generate combustion gas G by mixing fuel to the compressed air A and combusting the mixture, a turbine 30 driven by the combustion gas G, and a seal member 7 disposed between the combustor 20 and the turbine 30.

The turbine 30 includes a casing 31, and a turbine rotor 33 that rotates around a rotor axis Ar inside the casing 31. For example, the turbine rotor 33 is connected to a generator (not shown) that generates electricity as the turbine rotor 33 rotates.

Relative to the turbine 30, the compressor 10 is disposed on one side of the rotor axis Ar. The casing 31 of the turbine 30 has a cylindrical shape around the rotor axis Ar. Part of the compressed air A is supplied as cooling air from the compressor 10 to the turbine 30 and the combustors 20. The compressed air A pressurized in the compressor 10 is temporarily accumulated in a space inside the casing 31. The plurality of combustors 20 are mounted on the casing 31 at intervals in a circumferential direction Dc relative to the rotor axis Ar.

Here, the direction in which the rotor axis Ar extends will be referred to as an axial direction Da. In the axial direction Da, the side on which the turbine 30 is disposed relative to the combustors 20 will be referred to as the downstream side, and the opposite side will be referred to as the upstream side.

The circumferential direction Dc based on the rotor axis Ar will be referred to simply as the circumferential direction Dc, and a radial direction Dr based on the rotor axis Ar will be referred to simply as the radial direction Dr.

In the radial direction Dr, the side away from an axis line Ac will be referred to as the outer side in the radial direction Dr, and the opposite side will be referred to as the inner side in the radial direction Dr.

The axis line Ac of the combustor 20 in this embodiment is a line passing through the position of the center of gravity in each cross-section intersecting with the direction in which a transition piece 21 of the combustor 20 extends.

The turbine rotor 33 has a rotor main body 34 and a plurality of blade rows 35. The rotor main body 34 extends in the axial direction Da around the rotor axis Ar. The plurality of blade rows 35 are arrayed in the axial direction Da and mounted on the rotor main body 34.

Figure 2:
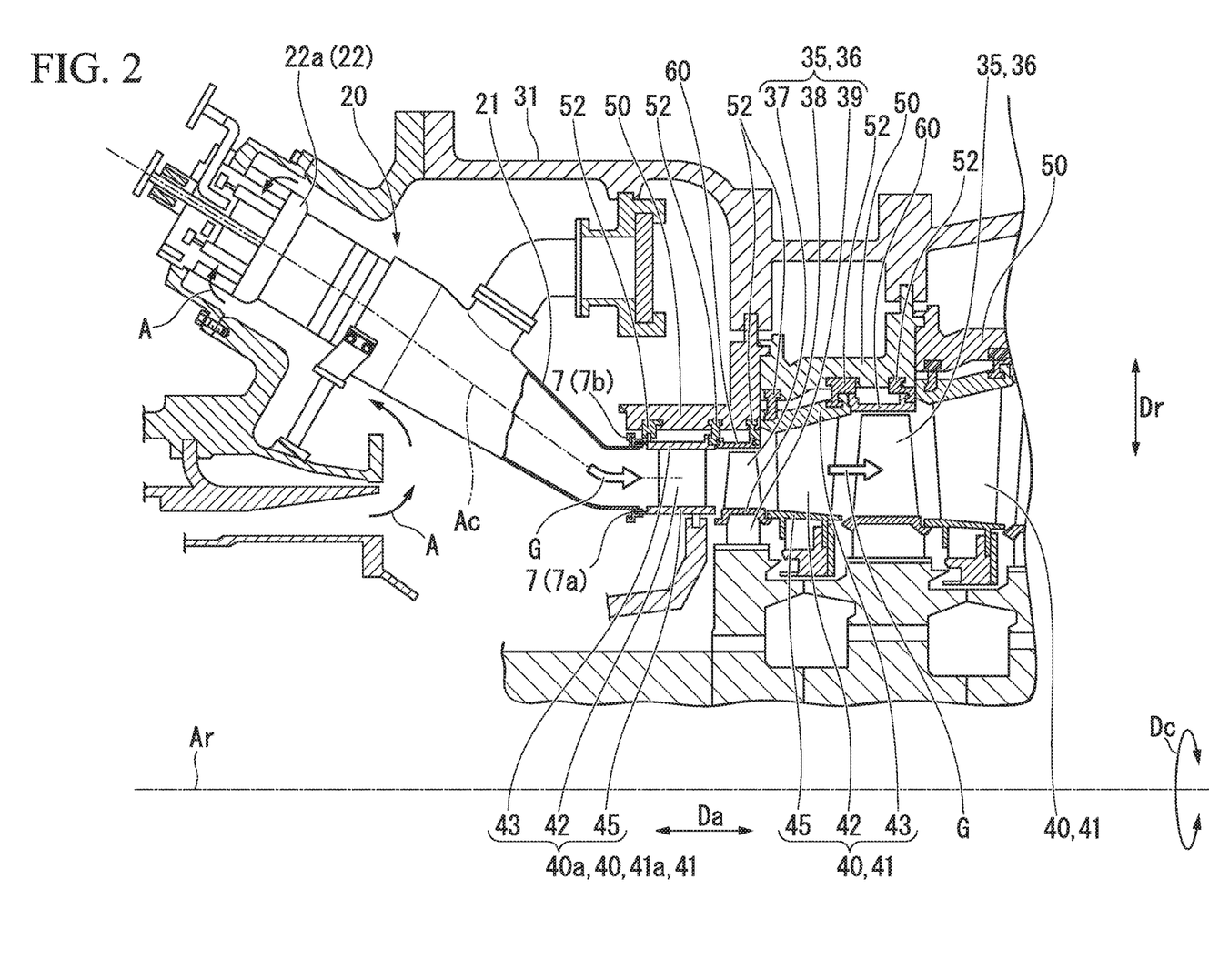
FIG. 2 is a sectional view of main parts of the gas turbine in the first embodiment of the present invention.

As shown in FIG. 2, the blade rows 35 each have a plurality of blades 36 that are arrayed in the circumferential direction Dc relative to the rotor axis Ar and mounted around the rotor axis Ar. The blade 36 has a blade main body 37, a platform 38, and a blade root 39. The blade main body 37 extends in the radial direction Dr. The platform 38 is provided on the inner side of the blade main body 37 in the radial direction Dr. The blade root 39 is provided on the inner side of the platform 38 in the radial direction Dr. The blade 36 is fixed to the rotor main body 34 as the blade root 39 is embedded into the rotor main body 34.

Vane rows 40 are disposed respectively on the upstream side of the plurality of blade rows 35. The vane rows 40 are each composed of a plurality of vanes 41 arrayed in the circumferential direction Dc. Each vane 41 has a vane main body 42, an outer shroud 43, and an inner shroud 45. The vane main body 42 extends toward the outer side in the radial direction Dr. The outer shroud 43 is provided on the outer side of the vane main body 42 in the radial direction Dr. The inner shroud 45 is provided on the inner side of the vane main body 42 in the radial direction Dr.

First vanes 41a composing a first vane row 40a of the vane rows 40 that is disposed on the most upstream side in the axial direction Da are connected through the seal member 7 to the transition piece 21 of the combustor 20 to be described later.

As shown in FIG. 2, a blade ring 50 having a cylindrical shape around the rotor axis Ar is disposed on the outer side of the blade row 35 and the vane row 40 in the radial direction Dr, on the inner side of the casing 31 in the radial direction Dr. The blade ring 50 is fixed to the casing 31. The outer shroud 43 of the vane 41 and the blade ring 50 are coupled together by a heat shield ring 52.

A plurality of ring segments 60 arrayed in the circumferential direction Dc around the rotor axis Ar are disposed between the outer shrouds 43 of the vane rows 40 adjacent to each other in the axial direction Da. The plurality of ring segments 60 arrayed in the circumferential direction Dc form an annular shape. The blade row 35 is disposed on the inner side of the plurality of ring segments 60 in the radial direction Dr. All the plurality of ring segments 60 arrayed in the circumferential direction Dc are coupled to the blade ring 50 by the heat shield ring 52.

A combustion gas flow passage Pg through which the combustion gas G flows is formed inside the casing 31 of the turbine 30. The combustion gas flow passage Pg is defined annularly around the rotor main body 34. The combustion gas flow passage Pg is defined by the inner shrouds 45 and the outer shrouds 43 of the plurality of vanes 41 composing the vane row 40, the platforms 38 of the plurality of blades 36 composing the blade row 35 on the downstream side of the vane row 40, and the ring segments 60 facing the platforms 38.

The combustor 20 includes the transition piece 21 and a fuel supply unit 22. The transition piece 21 sends the high-temperature high-pressure combustion gas G to the turbine 30. The fuel supply unit 22 supplies the fuel and the compressed air A into the transition piece 21.

A flame is formed inside the fuel supply unit 22. The fuel supply unit 22 has a combustor basket 22a having a tubular shape around the axis line Ac.

Figure 3:
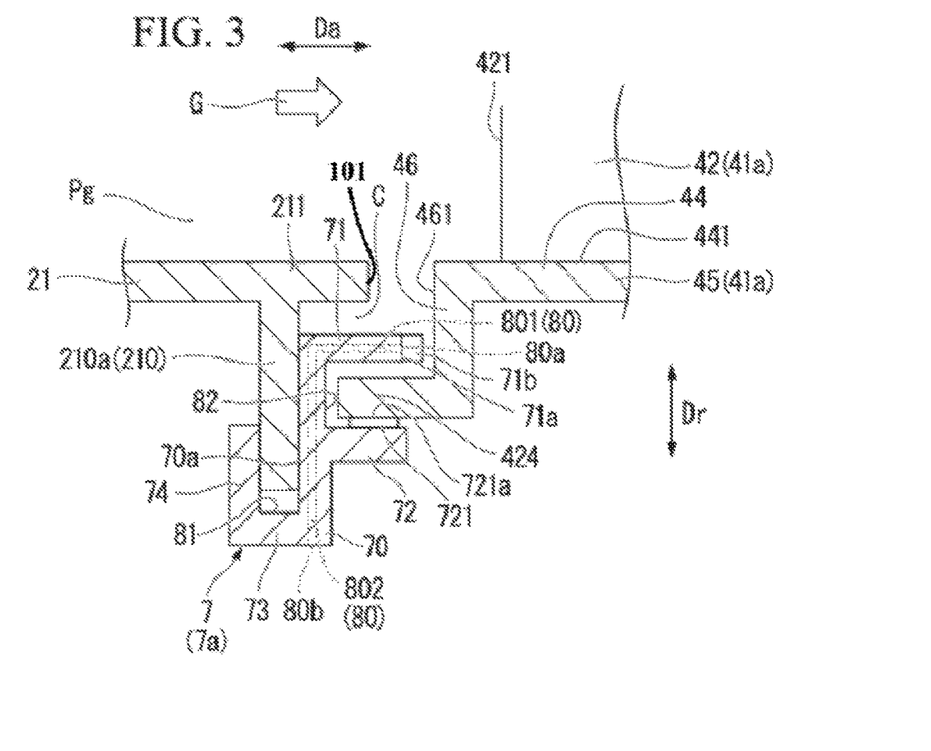
FIG. 3 is an enlarged view of main parts illustrating a seal member in the first embodiment of the present invention.

The transition piece 21 is connected to the combustor basket 22a. The transition piece 21 supplies the high-temperature high-pressure combustion gas G generated in the combustor basket 22a to the turbine 30. The transition piece 21 has a tubular shape. Specifically, an outlet opening of the transition piece 21 located on the downstream side in the axial direction Da has a roughly quadrangular shape. As shown in FIG. 3, the transition piece 21 has an outlet flange 210 that is located on the downstream side in the axial direction Da and protrudes from an outer circumferential surface of the transition piece 21.

As shown in FIG. 3, a shroud main body 44 and a lateral wall 46 are formed in the inner shroud 45 and the outer shroud 43 of the first vane 41a. The shroud main body 44 has a gas path surface 441 facing the combustion gas flow passage Pg. The lateral wall 46 intersects with the gas path surface 441 and extends from the combustion gas flow passage Pg toward the inner side in the radial direction Dr or the outer side in the radial direction Dr. A projection 424 extending toward the upstream side in the axial direction Da from a lateral end face 461 facing the upstream side in the axial direction Da is formed on the lateral wall 46.

The projection 424 is formed at a position away from the gas path surface 441 of the lateral end face 461, on the inner side in the radial direction Dr or the outer side in the radial direction Dr of the gas path surface 441. The projection 424 has an arc-like shape around the rotor axis Ar.

The outlet flange 210 has a substantially quadrangular annular shape so as to cover the periphery of the outlet opening of the transition piece 21. The outlet flange 210 protrudes from the outer circumferential surface of the transition piece 21 toward the outer side of the combustion gas flow passage Pg. The outlet flange 210 has a pair of circumferential flange portions 210a and a pair of radial flange portions (not shown).

The pair of circumferential flange portions 210a each protrude in a direction toward the outer side away from the combustion gas flow passage Pg, from a part of the outer circumferential surface of the transition piece 21 that extends in the circumferential direction Dc. The pair of circumferential flange portions 210a face each other in the radial direction Dr across the outlet opening.

As shown in FIG. 3, a rear end 211 of the transition piece 21 located on the downstream side in the axial direction Da extends further toward the downstream side in the axial direction Da than the outlet flange 210. The surface of the rear end 211 facing the downstream side in the axial direction Da faces the lateral end face 461 of the first vane 41a with a clearance provided therebetween.

The seal member 7 is a transition piece seal that is disposed between the combustor 20 and the first vane row 40a disposed on the downstream side of the combustor 20 in the axial direction Da and facing the combustion gas flow passage Pg. The seal member 7 seals the gap between the outlet flange 210 of the transition piece 21 of the combustor 20 and the inner shrouds 45 and the outer shrouds 43 of the first vanes 41a of the first vane row 40a. The seal member 7 of this embodiment is divided into an inner seal member 7a and an outer seal member 7b. The inner seal member 7a and the outer seal member 7b are respectively disposed along the circumferential flange portions 210a on the inner side in the radial direction Dr and the outer side in the radial direction Dr of the substantially quadrangular annular outlet flange 210. The inner seal member 7a engages with the circumferential flange portion 210a on the inner side in the radial direction Dr and with the inner shrouds 45 of the first vanes 41a. The outer seal member 7b engages with the circumferential flange portion 210a on the outer side in the radial direction Dr and with the outer shrouds 43 of the first vanes 41a.

The shapes of the inner seal member 7a on the inner side in the radial direction Dr and the outer seal member 7b on the outer side in the radial direction Dr are roughly symmetrical with respect to the axis line Ac of the transition piece 21. In the following description, therefore, the seal member 7 (inner seal member 7a) engaging with the inner shroud 45 on the inner side in the radial direction Dr will be mainly described as a typical example, but the same description is applicable to the outer seal member 7b as well.

Hereinafter, "seal member 7" will be used as the name and the reference sign in the description.

The seal member 7 of this embodiment is disposed on the outer side (the inner side in the radial direction Dr) of the combustion gas flow passage Pg through which the combustion gas G flows. As shown in FIG. 3, the seal member 7 is disposed in a cavity C that is formed in the clearance between the transition piece 21 and the inner shroud 45 of the first vane 41a. Here, the cavity C in this embodiment is the space formed between the transition piece 21 and the first vane 41a and facing the combustion gas flow passage Pg. The cavity C is formed further on the inner side in the radial direction Dr than an inner circumferential surface of the transition piece 21 and the gas path surface 441 of the first vane 41a. The cavity C is the space located further on the inner side in the radial direction Dr than the rear end 211 of the transition piece 21 and defined between the outlet flange 210 and the lateral end face 461 in the axial direction Da.

Figure 4:
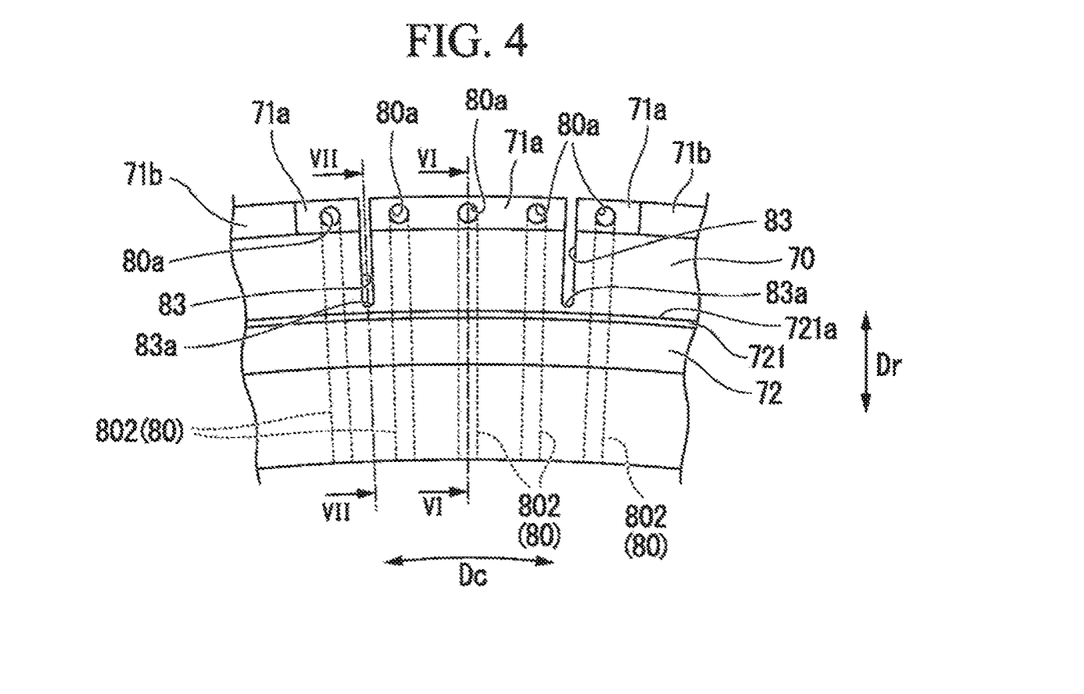
FIG. 4 is an enlarged view of main parts illustrating the seal member in the first embodiment of the present invention as seen from the downstream side in an axial direction.

The seal member 7 is formed annularly around the rotor axis Ar when seen from the downstream side in the axial direction Da. In a cross-section including the axis line Ac and spreading in the radial direction Dr, the seal member 7 of this embodiment has a main body part 70, a first protrusion 71, a second protrusion 72, a third protrusion 73, and a fourth protrusion 74. The main body part 70 extends in the radial direction Dr. The first protrusion 71 protrudes from the end of the main body part 70 located on the outer side in the radial direction Dr toward the downstream side in the axial direction Da. The second protrusion 72 is located at a position away from the first protrusion 71 and protrudes from the main body part 70 toward the downstream side in the axial direction Da. The third protrusion 73 protrudes from the end of the main body part 70 located on the inner side in the radial direction Dr toward the upstream side in the axial direction Da. The fourth protrusion 74 protrudes from the end of the third protrusion 73 located on the upstream side in the axial direction Da toward the outer side in the radial direction Dr. The seal member 7 of this embodiment has cooling channels 80 and slits 83 (FIG. 4). Cooling air is discharged from openings 80a of the cooling channels 80. The slits 83 are recessed toward the inner side in the radial direction Dr from a surface facing the combustion gas flow passage Pg.

The main body part 70 of this embodiment has a substantially rectangular shape of which the cross-section including the axis line Ac and spreading in the radial direction Dr is long in the radial direction Dr. The cooling channels 80 (802) extending in the radial direction are formed inside the main body part 70. Inflow ports 80b opening to the space inside the casing 31 are formed in the end face of the main body part 70 on the inner side in the radial direction.

The first protrusion 71 protrudes from the end of the main body part 70 located on the outer side in the radial direction Dr toward the lateral end face 461 on the downstream side in the axial direction Da. The first protrusion 71 of this embodiment has a substantially rectangular parallelepiped shape of which the cross-section including the axis line Ac and spreading in the radial direction Dr is long in the axial direction Da. The first protrusion 71 has an annular shape around the rotor axis Ar. The first protrusion 71 is formed in a space defined in the axial direction Da between a first end face 101 of the rear end 211 of the transition piece 21 and the projection 424. The first protrusion 71 has an end face 71a facing the downstream side in the axial direction Da so as to face the lateral end face 461. Inside the first protrusion 71, the cooling channels 80 (801) are formed along the axial direction Da. The plurality of cooling channels 80 (801) are arrayed at predetermined intervals in a certain region extending in the circumferential direction. The plurality of openings 80a having circular shapes and communicating with the cooling channels 80 (axial channels 801) are formed in the end face 71a. On the other hand, the cooling channels 80 (axial channels 801) communicate at the upstream side in the axial direction Da with the cooling channels 80 (radial channels 802) formed inside the main body part 70. A clearance forming portion 71b protruding further toward the downstream side in the axial direction Da than the end face 71a is formed at the end of the first protrusion 71 on the downstream side in the axial direction Da.

The end face 71a of this embodiment is the face at the end of the first protrusion 71 that is the end located on the downstream side in the axial direction Da opposite to the main body part 70. The end face 71a of this embodiment is formed so as to face the lateral end face 461, with a clearance left on the upstream side of the lateral end face 461 in the axial direction Da.

The second protrusion 72 is located at a position away from the first protrusion 71, on the inner side of the first protrusion 71 in the radial direction Dr, and protrudes from the main body part 70 toward the downstream side in the axial direction Da. The second protrusion 72 has a substantially rectangular parallelepiped shape of which the cross-section including the axis line Ac and spreading in the radial direction Dr is long in the axial direction Da. The second protrusion 72 has an annular shape around the rotor axis Ar. A concave groove in which the projection 424 is fitted in the axial direction Da is formed between the first protrusion 71 and the second protrusion 72. A contact seal member 721 is fixed to the second protrusion 72 of this embodiment.

The contact seal member 721 is a metal sheet, and is fixed to the surface of the second protrusion 72 facing the first protrusion 71. The contact seal member 721 has a first seal surface 721a that is formed annularly between the contact seal member 721 and the projection 424.

The first seal surface 721a comes in contact with the surface of the projection 424 facing the inner side in the radial direction Dr. The first seal surface 721a of this embodiment is the surface of the contact seal member 721 facing the side of the first protrusion 71 that is the outer side in the radial direction Dr.

The third protrusion 73 protrudes from the end of the main body part 70 located on the inner side in the radial direction Dr toward the upstream side in the axial direction Da opposite to the first protrusion 71. The third protrusion 73 of this embodiment has a substantially rectangular parallelepiped shape of which the cross-section including the axis line Ac and spreading in the radial direction Dr is long in the axial direction Da. The third protrusion 73 is formed at a position further on the inner side in the radial direction Dr than the circumferential flange portion 210a.

The fourth protrusion 74 protrudes from the end of the third protrusion 73 located on the upstream side in the axial direction Da toward the outer circumferential surface of the transition piece 21. The fourth protrusion 74 has a substantially rectangular parallelepiped shape of which the cross-section including the axis line Ac and spreading in the radial direction Dr is long in the radial direction Dr. The fourth protrusion 74 is located at a position further on the upstream side in the axial direction Da than the circumferential flange portion 210a, and protrudes from the third protrusion 73.

A second seal surface 70a that comes in contact with the surface of the circumferential flange portion 210a facing the downstream side in the axial direction Da is formed in the surface of the main body part 70 facing the upstream side in the axial direction Da. Specifically, a differential pressure between the pressure of the compressed air A inside the casing 31 and the pressure on the side of the combustion gas flow passage Pg acts on the surface of the circumferential flange portion 210a facing the downstream side in the axial direction Da, so that that surface is pressed against the surface facing the upstream side in the axial direction Da of the main body part 70 located on the downstream side in the axial direction Da. Thus, during normal operation of the gas turbine 1, the second seal surface 70a that seals by coming in contact with the surface of the circumferential flange portion 210a facing the downstream side in the axial direction Da is always formed in the surface of the main body part 70 facing the upstream side in the axial direction Da.

Figure 5:
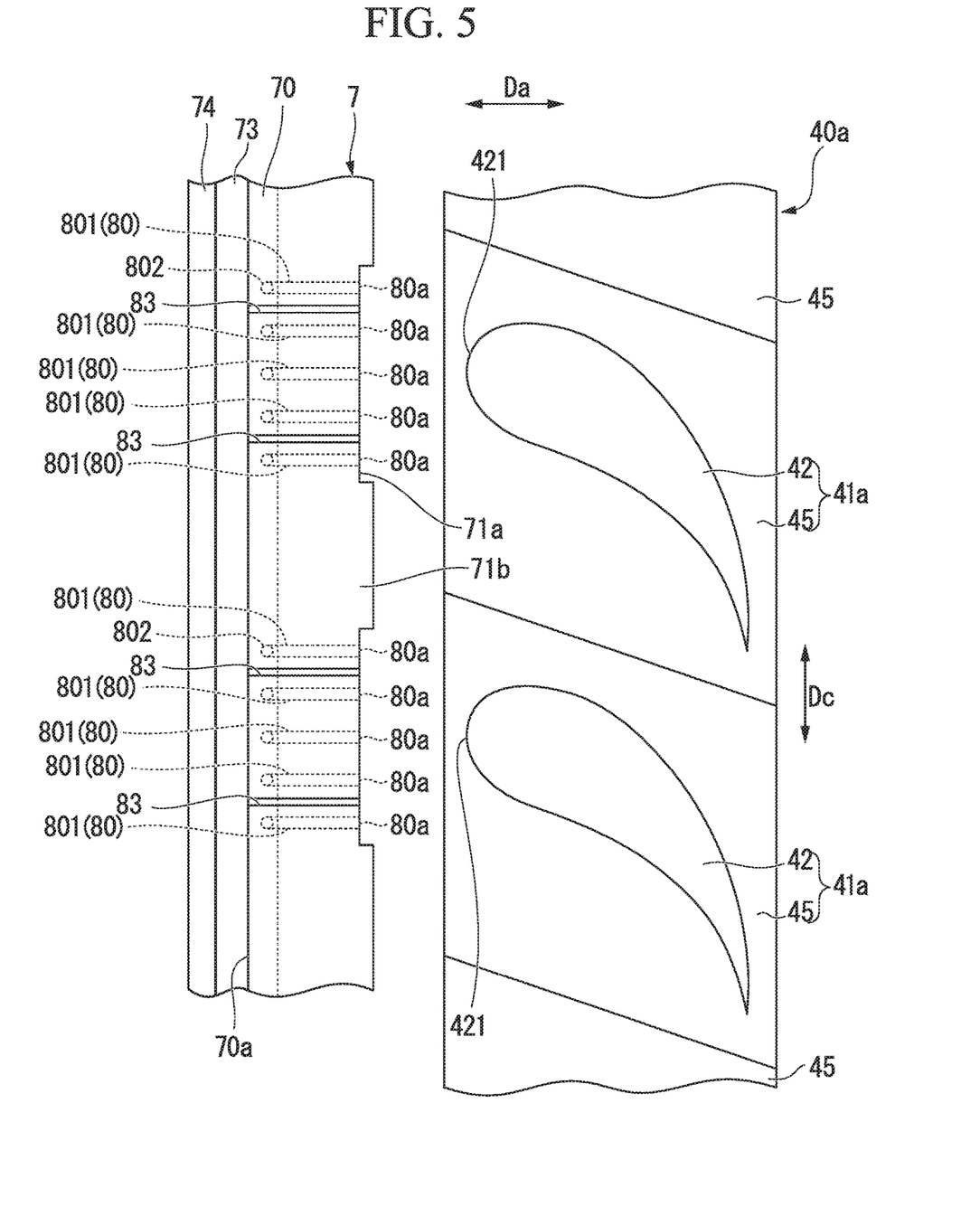
FIG. 5 is a schematic view illustrating the positions of openings in the first embodiment of the present invention.

As shown in FIG. 4, the plurality of openings 80a of this embodiment are formed in a predetermined region of the end face 71a at intervals in the circumferential direction Dc. As shown in FIG. 5, relative to a leading edge 421 that is a region of the vane main body 42 facing the upstream side in the axial direction Da, the openings 80a are formed in a certain region of the end face 71a in the circumferential direction Dc including a position on the upstream side of the leading edge 421 in the axial direction Da. That is, the openings 80a of this embodiment are formed on the upstream side of the leading edge 421 in the axial direction Da so that the position of the opening 80a in the circumferential direction Dc corresponds to the position at which the leading edge 421 of the vane main body 42 is formed. Specifically, the plurality of cooling channels 80 having the openings 80a are arrayed in the circumferential direction along the axial direction Da so as to be centered at the position on the upstream side in the axial direction Da corresponding to the position at which the leading edge 421 of the vane main body 42 is formed. However, the area where the cooling channels 80 should be arrayed is limited to some regions in a certain area extending in the circumferential direction, and thus the cooling channels 80 do not need to be disposed along the entire length of the first protrusion 71 in the circumferential direction.

The clearance forming portion 71b is disposed adjacent to the end face 71a, in which the openings 80a are formed, in the circumferential direction Dc. The clearance forming portion 71b protrudes from the end face 71a toward the lateral end face 461 on the downstream side in the axial direction Da. The clearance forming portion 71b of this embodiment is formed so as to be located on both sides in the circumferential direction Dc of the predetermined region of the end face 71a in which the openings 80a are formed.

Figure 6:
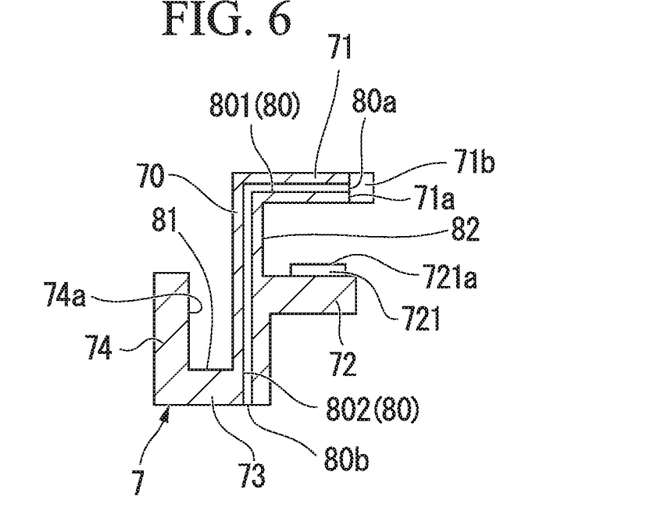
FIG. 6 is a sectional view illustrating the section VI-VI in FIG. 4.

As described above, the compressed air A from the space inside the casing 31 of the turbine 30 is taken into the cooling channels 80 as cooling air, passed through the cooling channels 80, and jetted out from the openings 80a toward the lateral end face 461. The cooling channel 80 of this embodiment has a circular cross-sectional shape. The plurality of cooling channels 80 are formed so as to penetrate the inside of the main body part 70 and the first protrusion 71. Specifically, as shown in FIG. 6, the cooling channel 80 of this embodiment includes the axial channel 801 and the radial channel 802. The axial channel 801 is formed from the opening 80a toward the upstream side in the axial direction Da. The radial channel 802 communicates with the axial channel 801 on the upstream side in the axial direction Da and extends toward the inner side in the radial direction Dr.

As shown in FIG. 4, the slits 83 are recessed toward the inner side in the radial direction Dr from the surfaces of the main body part 70 and the first protrusion 71 that are located on the side of the combustion gas flow passage Pg and face the outer side in the radial direction Dr. The plurality of slits 83 are each formed in a region adjacent to the axial channel 801 leading to the opening 80a, at a distance from the opening 80a in the circumferential direction Dc.

The slit 83 of this embodiment has the shape of a thin long groove so as to divide the end face 71a, in which the openings 80a are formed, in the axial direction Da. The position of a slit bottom 83a of the slit 83 of this embodiment that is an end of a cut formed on the outer side relative to the combustion gas flow passage Pg is disposed at a position closer to the combustion gas flow passage Pg than the position at which the first seal surface 721a of the second protrusion 72 is formed and the position on the innermost side in the radial direction Dr at which the second seal surface 70a is formed.

Figure 7:
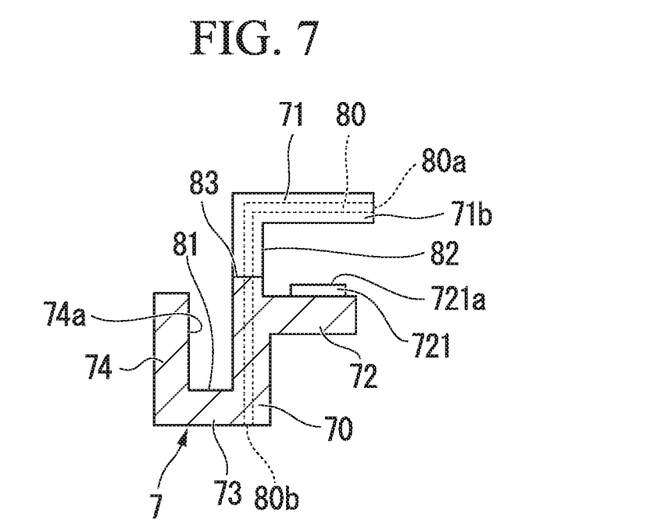
FIG. 7 is a sectional view illustrating the section VII-VII in FIG. 4.

As shown in FIG. 7, the slits 83 of this embodiment are recessed toward the inner side in the radial direction Dr from the surfaces of the main body part 70 and the first protrusion 71 on the side of the combustion gas flow passage Pg so that the positions of the slit bottoms 83a are located at positions further on the outer side in the radial direction Dr than the position of the surface of the first seal surface 721a facing the outer side in the radial direction Dr and the position of the second seal surface 70a on the innermost side in the radial direction Dr.

The seal member 7 of this embodiment includes a first engaging part 81 located on the upstream side in the axial direction Da and connected to the transition piece 21 of the combustor 20, and a second engaging part 82 located on the downstream side in the axial direction Da and connected to the inner shroud 45 of the first vane 41a.

The first engaging part 81 seals so that the compressed air A inside the casing 31 does not leak toward the combustion gas flow passage Pg through the gap between the outlet flange 210 and the seal member 7. The first engaging part 81 of this embodiment is composed of the main body part 70, the third protrusion 73, and the fourth protrusion 74.

The first engaging part 81 of this embodiment is so structured that the circumferential flange portion 210a is fitted from the radial direction Dr into a groove formed by the surface of the main body part 70 facing the upstream side in the axial direction Da, the surface of the third protrusion 73 facing the outer side in the radial direction Dr, and the second seal surface 70a of the fourth protrusion 74. As a result, the second seal surface 70a is formed in the surfaces, in contact with each other, of the surface of the circumferential flange portion 210a facing the downstream side in the axial direction Da and the surface of the main body part 70 facing the upstream side in the axial direction Da.

The second engaging part 82 engages the projection 424 and the seal member 7 with each other and seals so that the compressed air A inside the casing 31 does not leak from the gap between the projection 424 and the seal member 7 toward the combustion gas flow passage Pg. The second engaging part 82 of this embodiment is composed of the main body part 70, the first protrusion 71, and the second protrusion 72.

Specifically, the second engaging part 82 of this embodiment is a groove formed by the surface of the main body part 70 facing the downstream side in the axial direction Da, the surface of the first protrusion 71 facing the inner side in the radial direction Dr, and the first seal surface 721*a* of the second protrusion 72. In this embodiment, the projection 424 is fitted into the groove, which is the second engaging part 82, from the downstream side toward the upstream side in the axial direction Da. In this case, the first seal surface 721*a* is in contact with the surface of the projection 424 facing the inner side in the radial direction Dr. The seal member 7 is engaged with the outlet flange 210 of the transition piece 21 and the projection 424 of the inner shroud 45 through the first engaging part 81 and the second engaging part 82. Thus, the sealability between the seal member 7 and the outlet flange 210 is maintained.

Next, the workings of the gas turbine 1 will be described.

According to the gas turbine 1 of this embodiment, the compressed air A from the compressor 10 enters the space inside the casing 31 of the turbine 30 and is supplied into the combustor 20. In the combustor 20, fuel supplied from the outside is combusted along with the compressed air A inside the combustor basket 22*a* to generate the combustion gas G. The combustion gas G flows through the transition piece 21 into the combustion gas flow passage Pg of the turbine 30. While passing through the combustion gas flow passage Pg, the combustion gas G comes in contact with the blade main bodies 37 and rotates the turbine rotor 33 around the rotor axis Ar.

Part of the combustion gas G flowing through the combustion gas flow passage Pg flows from the transition piece 21 into the combustion gas flow passage Pg. During this process, the combustion gas G impinges on the leading edge 421 of the vane main body 42, and part of the combustion gas G is thereby entrapped through the clearance formed between the rear end 211 of the transition piece 21 and the inner shroud 45 and flows into the cavity C. As a result, of the surfaces of the main body part 70 and the first protrusion 71 of the seal member 7 facing the combustion gas flow passage Pg, a certain region in the circumferential direction including the end face 71*a* of the first protrusion 71 facing the position on the upstream side in the axial direction Da of the leading edge 421 of the vane main body 42 is exposed to the high-temperature combustion gas G.

During normal operation of the gas turbine 1, the pressure inside the casing 31 is higher than the pressure inside the cavity C communicating with the combustion gas flow passage Pg. Thus, the outlet flange 210 is pressed by the differential pressure between the compressed air A and the combustion gas G against the seal member 7 on the downstream side in the axial direction Da, so that the seal member 7 is engaged with the outlet flange 210 through the first engaging part 81.

The seal member 7 is engaged with the projection 424 through the second engaging part 82. The first seal surface 721*a* of the contact seal member 721 provided in the second protrusion 72 is pressed against the surface of the projection 424 facing the inner side in the radial direction Dr. Thus, the gap between the first seal surface 721*a* and the surface of the projection 424 facing the inner side in the radial direction Dr is sealed.

In this state, part of the compressed air A entering inside the casing 31 from the compressor 10 flows into the cooling channel 80 of the seal member 7, and thereby cools the seal member 7.

Specifically, the compressed air A inside the casing 31 flows from the inflow port 80*b* into the axial channel 801, flows through the radial channel 802, and is jetted out of the opening 80*a* into the cavity C. Thus, the main body part 70 and the first protrusion 71 exposed to the combustion gas G are cooled.

According to the seal member 7 as has been described above, the clearance forming portion 71*b* protruding from the end face 71*a* is provided, so that, even if the end face 71*a* and the lateral end face 461 of the inner shroud 45 approach each other, the openings 80*a* can be prevented from being blocked. Specifically, the differences in thermal elongation among the transition piece 21, the inner shroud 45, and the seal member 7 cause the inner shroud 45 and the seal member 7 to approach each other in the axial direction Da, so that the clearance between the end face 71*a* of the seal member 7 and the lateral end face 461 of the inner shroud 45 is reduced. As a result, the openings 80*a* provided in the end face 71*a* may be blocked due to the end face 71*a* and the lateral end face 461 coming in contact with each other.

In this embodiment, however, the clearance forming portion 71*b* protrudes further toward the downstream side in the axial direction Da than the end face 71*a* in which the openings 80*a* are formed. Thus, even when the clearance between the end face 71*a* of the first protrusion 71 and the lateral end face 461 of the inner shroud 45 is reduced, the clearance forming portion 71*b* comes in contact with the lateral end face 461 before the openings 80*a* are blocked. Thus, a space in front (on the downstream side in the axial direction Da) of the openings 80*a* can be stably secured, so that the required cooling air can be discharged from the openings 80*a* stably and continuously even when the clearance between the end face 71*a* and the lateral end face 461 is reduced.

Specifically, the clearance forming portion 71*b* serves as a stopper for the openings 80*a* in the axial direction Da. Thus, a certain clearance is reliably left between the lateral end face 461 and the end face 71*a* in which the openings 80*a* are disposed. In this way, blockage of the openings 80*a* is prevented by providing the clearance forming portion 71*b*. Accordingly, the compressed air A as cooling air can be stably passed through the axial channels 801 and the radial channels 802. As a result, the seal member 7 can be cooled stably and continuously.

As the seal member 7 is disposed on the outer side in the radial direction Dr relative to the combustion gas flow passage Pg, direct contact of the seal member 7 with the high-temperature combustion gas G flowing through the combustion gas flow passage Pg can be avoided. Thus, the seal member 7 is exposed to only part of the combustion gas G that flows in through the clearance between the rear end 211 of the transition piece 21 and the lateral end face 461 of the inner shroud 45. As a result, the seal member 7 can be prevented from reaching a high temperature.

The openings 80*a* provided in the end face 71*a* are formed on the upstream side of the leading edge 421 in the axial direction Da so that the position of the opening 80*a* in the circumferential direction Dc corresponds to the position at which the leading edge 421 of the vane main body 42 is formed. Thus, it is possible to effectively cool the seal member 7 that reaches a high temperature as the combustion gas G impinging on the leading edge 421 of the vane main body 42 is entrapped.

Specifically, as the combustion gas G impinges on the leading edge 421, the combustion gas G is entrapped in the vicinity of the upstream side of the leading edge 421 in the axial direction Da, and that combustion gas G is likely to flow into the cavity C through the clearance between the rear end 211 of the transition piece 21 and the lateral end face 461 of the inner shroud 45. As a result, in the vicinity of the upstream side of the leading edge 421 in the axial direction Da, the main body part 70 and the first protrusion 71 partially reach high temperatures due to the entrapped combustion gas G.

It is therefore not necessary to dispose the cooling channels 80 along the entire length of the first protrusion 71 in the circumferential direction Dc. Accordingly, the cooling channels 80 are provided partially in the vicinity of the position on the upstream side in the axial direction Da corresponding to the leading edge 421, and the openings 80a are provided at the ends of the cooling channels 80 on the downstream side in the axial direction Da. Thus, it is possible to cool the seal member 7 by efficiently supplying the cooling air to those parts of the main body part 70 and the first protrusion 71 that reach high temperatures. In other words, the seal member 7 should be disposed further on the outer side than the combustion gas flow passage Pg and the cooling channels 80 should be disposed at least partially in the circumferential direction Dc. In this way, the flow rate of the cooling air in the seal member 7 as a whole can be reduced. Accordingly, the flow rate of the compressed air A used as cooling air can be reduced, so that performance degradation of the gas turbine 1 can be further suppressed.

As the clearance forming portion 71b is formed so as to be located on both sides of the predetermined region of the end face 71a, in which the openings 80a are formed, in the circumferential direction Dc, the openings 80a can be disposed in the vicinity of the clearance forming portion 71b. Thus, a space in front of the openings 80a can be secured with high precision by the clearance forming portion 71b. It is therefore possible to prevent blockage of the openings 80a and pass the compressed air A as cooling air more stably through the axial channels 801 and the radial channels 802. Accordingly, the seal member 7 can be cooled more stably and continuously.

The main body part 70 and the first protrusion 71 are partially cooled in the circumferential direction Dc as the compressed air A flows through the axial channels 801 and the radial channels 802. As a result, a temperature distribution in the circumferential direction Dc occurs inside the main body part 70 and the first protrusion 71 between portions where the cooling channels 80 are formed and the surrounding portions. Accordingly, a distribution of thermal stress in the circumferential direction Dc occurs inside the seal member 7, which results in distortion due to a difference in thermal elongation.

However, forming the slits 83 recessed in the radial direction Dr in the main body part 70 and the first protrusion 71 can reduce the rigidity of the main body part 70 and the first protrusion 71. As a result, the seal member 7 can deflect easily to absorb the distortion occurring inside the main body part 70 and the first protrusion 71 due to the distribution of thermal stress in the circumferential direction Dc.

The slit bottom 83a is disposed on the side closer to the combustion gas flow passage Pg than the end on the inner side in the radial direction Dr of the second seal surface 70a formed in the main body part 70 (the end of the outlet flange 210 on the inner side in the radial direction Dr), and is disposed on the side closer to the combustion gas flow passage Pg than the first seal surface 721a of the contact seal member 721 disposed in the first protrusion 71. Thus, it is possible to form the slit 83 while maintaining the sealed state by the first seal surface 721a and the second seal surface 70a.

While the inner seal member 7a engaging with the inner shroud 45 on the inner side in the radial direction Dr has been mainly described above, the same description is applicable to the outer seal member 7b as well that engages with the outer shroud on the outer side in the radial direction Dr.

Modified Example of First Embodiment

Figure 8:
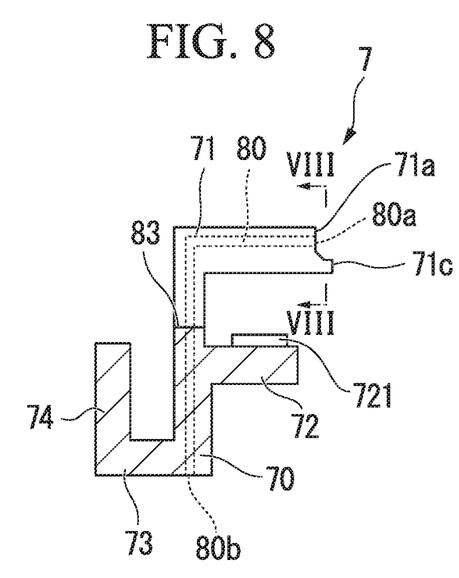
FIG. 8 is a modified example of the seal member of the first embodiment of the present invention.
Figure 9:
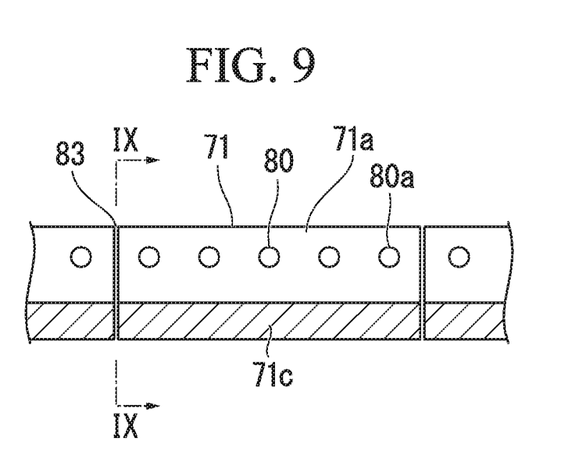
FIG. 9 is a sectional view illustrating the section VIII-VIII in FIG. 8.

This modified example is different from the first embodiment in the structure around the clearance forming portion of the seal member 7. The configuration is otherwise the same as in the first embodiment. In the following, this modified example will be described with reference to FIG. 8 and FIG. 9, in terms only of the structure different from that of the first embodiment. FIG. 8 is a sectional view of the seal member 7 in a cross-section including the slit 83 as seen in the circumferential direction, and shows the section IX-IX in FIG. 9. FIG. 9 is a view showing the section VIII-VIII in FIG. 8. The following description of the seal member 7 is intended for the inner seal member 7a, but the same concept is applicable to the outer seal member 7b as well.

As in the first embodiment, the seal member 7 shown in this modified example is disposed on the outer side of the combustion gas flow passage Pg. The seal member 7 is disposed in the cavity C formed in the clearance between the transition piece 21 and the inner shroud 45 of the first vane 41a.

As shown in FIG. 8, a clearance forming portion 71c of the seal member 7 of this modified example is formed in the end face 71a that is located at the downstream end of the first protrusion 71 in the axial direction Da and faces the downstream side in the axial direction Da. The clearance forming portion 71c is formed in the end face 71a further on the inner side in the radial direction Dr than the opening 80a. The clearance forming portion 71c protrudes from the end face 71a toward the downstream side in the axial direction Da. The clearance forming portion 71c is formed integrally with the end face 71a. The clearance forming portion 71c extends in the circumferential direction Dc.

As shown in FIG. 9, the clearance forming portion 71c is formed on the inner side in the radial direction Dr relative to the openings 80a of the cooling channels 80 formed in the end face 71a. As in the first embodiment, the cooling channels 80 do not need to be disposed over the entire region in the circumferential direction Dc but should be disposed at least partially in the circumferential direction Dc. The concept that the cooling channels 80 are disposed in a certain region in the circumferential direction Dc including the position on the upstream side in the axial direction Da at which the cooling channel 80 faces the leading edge 421 of the vane main body 42 is the same as in the first embodiment.

The clearance forming portion 71c may be provided, as in this modified example, over the entire region in the circumferential direction Dc of the end face 71a of the first protrusion 71 on the downstream side in the axial direction Da, or may be provided only in some regions in the circumferential direction Dc. This modified example is the same as the first embodiment in that the slits 83 are formed in the main body part 70 and the first protrusion 71 at regular intervals in the circumferential direction Dc.

According to this modified example, even if the inner shroud 45 and the seal member 7 approach each other in the axial direction Da due to the differences in thermal elongation among the transition piece 21, the inner shroud 45, and the seal member 7, the end face of the clearance forming portion 71c on the downstream side in the axial direction Da comes in contact with the lateral end face 461 of the inner shroud 45 before the end face 71a comes in contact with the lateral end face 461. Accordingly, a clearance is reliably left in front (on the downstream side in the axial direction) of the openings 80a, so that the openings 80a are not blocked. Thus, the clearance forming portion 71c serves as a stopper for preventing blockage of the openings 80a in the axial direction Da.

Second Embodiment

A second embodiment of the present invention will be described below with reference to FIG. 10.

The second embodiment is different from the first embodiment in that the seal member is disposed so as to face the combustion gas flow passage Pg, and that the structure of the seal member including the clearance forming portion is changed. FIG. 10 is an enlarged view of main parts around the seal member in this embodiment.

Those components that are the same as in the first embodiment will be given the same reference signs while the detailed description thereof will be omitted. In the second embodiment, as in the first embodiment, a seal member 9 (inner seal member 9a) engaging with the inner shroud 45 on the inner side in the radial direction Dr will be described, but the same concept is applicable to a seal member 9 (outer seal member 9b) as well that engages with the outer shroud 43 on the outer side in the radial direction Dr.

Figure 10:
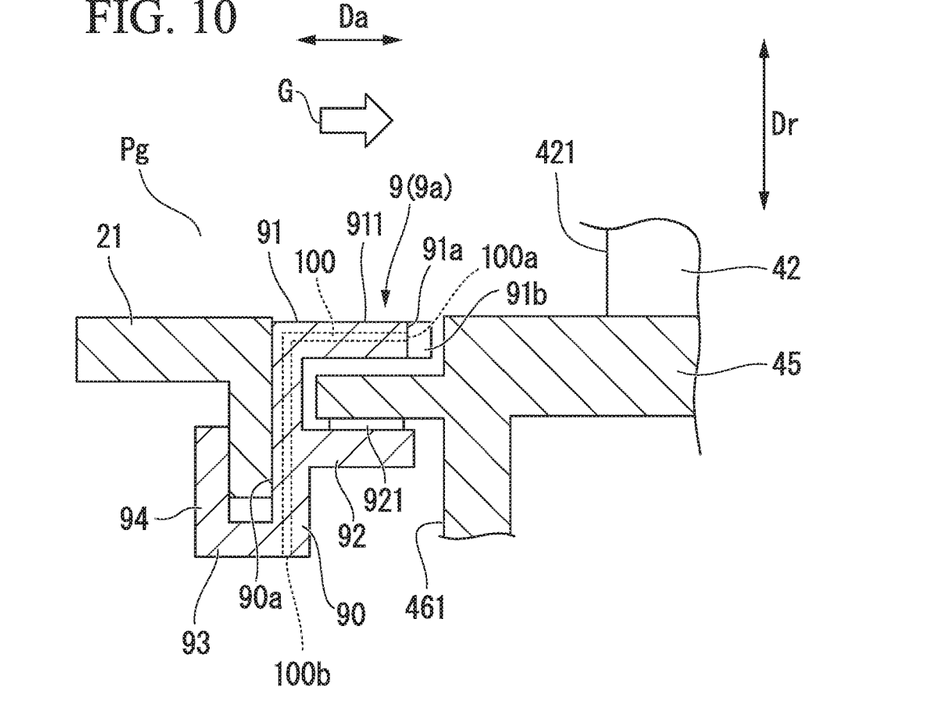
FIG. 10 is an enlarged view of main parts around a seal member in a second embodiment of the present invention.

As with the seal member 7 of the first embodiment, in FIG. 10, the seal member 9 has a structure formed by a main body part 90, a first protrusion 91, a second protrusion 92, a third protrusion 93, and a fourth protrusion 94. In the second embodiment, however, the seal member 9 is disposed between the transition piece 21 and the inner shroud 45. The seal member 9 has the first protrusion 91 facing the combustion gas flow passage Pg and forming a part of the combustion gas flow passage Pg. Thus, an outer surface (gas path surface 911) of the first protrusion 91 facing the combustion gas flow passage Pg is exposed to the high-temperature combustion gas G.

In the first protrusion 91 of the seal member 9, cooling channels 100 extending in the axial direction Da are arrayed. However, unlike the cooling channels of the first embodiment, the cooling channels 100 of the second embodiment are disposed along the entire surface of the first protrusion 91 in the circumferential direction Dc at predetermined intervals in the circumferential direction Dc. Openings 100a connected to the cooling channels 100 are formed in an end face 91a of the first protrusion 91 located on the downstream side in the axial direction Da. It is the same as in the first embodiment that the compressed air A used as cooling air is supplied from the space inside the casing 31 into inflow ports 100b formed at the end of the main body part 90 of the seal member 9 located on the inner side in the radial direction Dr, and that the inflow ports 100b communicate with the cooling channels 100.

A clearance forming portion 91b protruding from the end face 91a toward the downstream side in the axial direction Da is formed in the end face 91a of the first protrusion 91 located on the downstream side in the axial direction Da. The clearance forming portions 91b are provided adjacent to one another at intervals in the circumferential direction Dc and formed integrally with the end face 91a. The end face of the clearance forming portion 91b facing the downstream side in the axial direction Da faces the lateral end face 461 formed in the lateral wall 46 of the first vane 41a that is adjacent to the downstream side of the clearance forming portion 91b in the axial direction Da with a clearance left therebetween.

Figure 11:
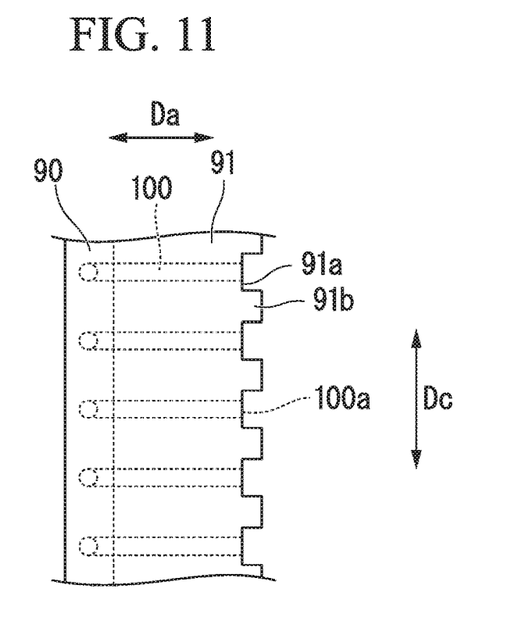
FIG. 11 is a plan view of the seal member as seen in a radial direction from the side of a combustion gas flow passage in FIG. 10.

FIG. 11 is a plan view of the seal member 9 as seen in the radial direction Dr from the side of the combustion gas flow passage Pg in FIG. 10. The cooling channels 100 extend in the axial direction Da inside the first protrusion 91 of the seal member 9. The cooling channels 100 are arrayed at predetermined intervals in the circumferential direction Dc. The openings 100a are formed in the end face 91a on the downstream side of the cooling channels 100 in the axial direction Da. The clearance forming portion 91b is formed adjacent to the end face 91a, in which the openings 100a are arrayed, in the circumferential direction Dc. The clearance forming portion 91b protrudes toward the downstream side in the axial direction Da relative to the end face 91a. In the example shown in FIG. 11, the clearance forming portions 91b are each provided between the cooling channels 100 that are adjacent to each other in the circumferential direction Dc. In addition, in the example shown in FIG. 11, the clearance forming portions 91b are provided so as to be adjacent to each cooling channel 100 from both sides in the circumferential direction Dc. However, in the example shown in FIG. 11, one clearance forming portion 91b may be provided in the circumferential direction Dc for a plurality of cooling channels 100 and openings 100a.

In the case of the second embodiment, the cooling channels 100 are disposed over the entire region of the first protrusion 91 in the circumferential direction Dc, so that the width of temperature distribution in the circumferential direction Dc is not so large as in the first embodiment. Accordingly, in the case of the seal member 9 of the second embodiment, it is not necessary to provide the main body part 90 and the first protrusion 91 with the slits 83 that absorb thermal stress in the circumferential direction Dc.

According to the structure of the second embodiment, as with the first embodiment, even if the inner shroud 45 and the seal member 9 approach each other in the axial direction Da due to the differences in thermal elongation among the transition piece 21, the inner shroud 45, and the seal member 9, the end face of the clearance forming portion 91b on the downstream side in the axial direction Da comes in contact with the lateral end face 461 of the inner shroud 45 before the end face 91a comes in contact with the lateral end face 461. Accordingly, a clearance is left in front (on the downstream side in the axial direction Da) of the openings 100a, and the openings 100a are not blocked. Thus, the clearance forming portion 91b serves as a stopper for the openings 100a in the axial direction Da, so that a certain clearance is reliably left between the lateral end face 461 and the end face 91 in which the openings 100a are disposed.

Modified Example of Second Embodiment

Figure 12:
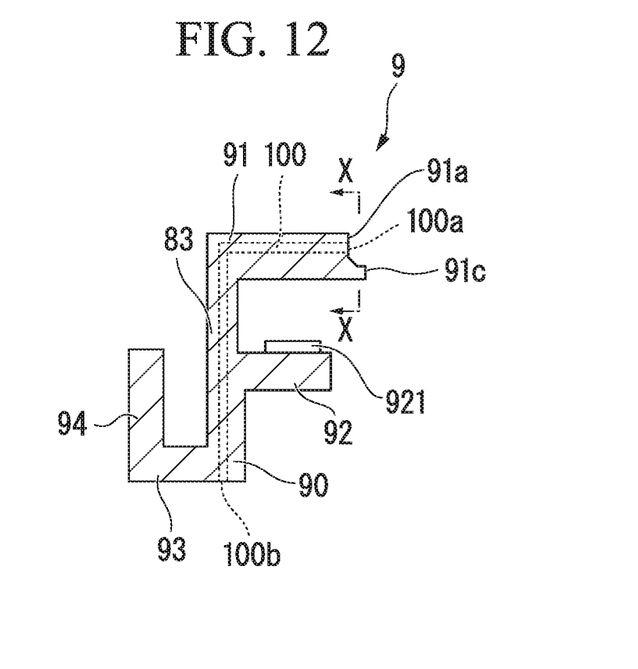
FIG. 12 is a modified example of the seal member of the second embodiment of the present invention.
Figure 13:
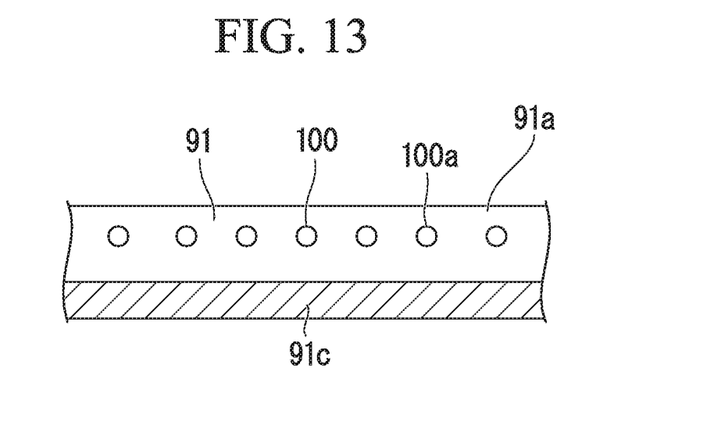
FIG. 13 is a sectional view illustrating the section X-X in FIG. 12.

This modified example shows a modified example of the seal member employed in the second embodiment. The structure around the clearance forming portion of the seal member of the modified example of the second embodiment is basically the same as that of the modified example of the first embodiment. The seal member 9 of the modified example of the second embodiment will be described using FIG. 12 and FIG. 13. In this modified example, too, the inner seal member 9a will be described below. The same concept is applicable to the outer seal member 9b as well. FIG. 12 shows a cross-section of the seal member 9 as seen from the circumferential direction Dc, and FIG. 13 shows the section (section X-X in FIG. 12) of the end face 91a as seen from the upstream side toward the downstream side in the axial direction Da.

As in the second embodiment, the seal member 9 of this modified example is disposed between the transition piece 21 and the inner shroud 45. The seal member 9 has the first protrusion 91 facing the combustion gas flow passage Pg and forming a part of the combustion gas flow passage Pg. Thus, the outer surface (gas path surface 911) of the first protrusion 91 facing the combustion gas flow passage Pg is exposed to the high-temperature combustion gas G.

As shown in FIG. 12, a clearance forming portion 91c of the seal member 9 shown in this modified example is formed in the end face 91a of the first protrusion 91 located on the downstream side in the axial direction Da, further on the inner side in the radial direction Dr than the opening 100a. The clearance forming portion 91c protrudes from the end face 91a toward the downstream side in the axial direction Da, is formed integrally with the end face 91a in the circumferential direction Dc, and extends in the circumferential direction Dc.

However, the seal member 9 shown in the modified example of the second embodiment is different from the seal member 7 shown in the modified example of the first embodiment in that the cooling channels are disposed differently and that the slits are not provided. Specifically, as described above, the plurality of cooling channels 100 of this modified example are formed over the entire region of the first protrusion 91 in the circumferential direction Dc. On the other hand, in the modified example of the first embodiment, the cooling channels 100 are disposed partially in some regions in the circumferential direction Dc. As shown in FIG. 13, in the case of the modified example of the first embodiment, the slits 83 are provided to absorb thermal stress of the seal member 7 in the circumferential direction Dc. In the case of this modified example, it is not necessary to provide the slits 83, as the temperature distribution in the circumferential direction Dc is small.

According to the structure of this modified example, as in the other embodiments, the end face of the clearance forming portion 91c on the downstream side in the axial direction Da first comes in contact with the lateral end face 461 facing that end face. Accordingly, a clearance is left in front (on the downstream side in the axial direction Da) of the openings 100a, and the opening 100a are not blocked. Thus, the clearance forming portion 91c serves as a stopper for the openings 100a in the axial direction Da, so that a certain clearance is reliably left between the lateral end face 461 and the end face 91a in which the openings 100a are disposed.

While the embodiments of the present invention have been described in detail with reference to the drawings, the components, the combinations thereof, etc. described in each embodiment are merely examples, and addition, omission, substitution, and other changes can be made to those components within the scope of the gist of the present invention. The present invention is not limited by the embodiments but limited only by the scope of claims.

The clearance forming portions 71b, 71c, 91b, 91c are not limited to the form in which, as in the above embodiments, the clearance forming portion is disposed adjacent to the openings 80a, 100a in the circumferential direction Dc. The clearance forming portions 71b, 71c, 91b, 91c should at least be able to form a space between the end faces 71a, 91a in which the openings 80a, 100a are provided and the lateral end face 461 of the inner shroud 45 so as not to block the openings 80a, 100a.

In the above embodiments, the openings 80a, 100a formed in an array in the circumferential direction Dc have the same shape, but the openings 80a, 100a are not limited to this example. The openings 80a, 100a may have an arbitrary shape according to the position in the circumferential direction Dc. For example, the openings 80a, 100a that are formed on the upstream side of the leading edge 421 in the axial direction Da may be of a larger size, while the openings 80a, 100a that are formed at positions other than the upstream side of the leading edge 421 in the axial direction Da may be of a smaller size.

INDUSTRIAL APPLICABILITY

According to the above-described seal member, cooling air can be passed through the seal member without blockage of the openings, so that the seal member can be cooled stably and continuously.

REFERENCE SIGNS LIST

1 Gas turbine
A Compressed air
10 Compressor
20 Combustor
Ac Axis line
Da Axial direction
21 Transition piece
210 Outlet flange
210a Circumferential flange portion
211 Rear end
22 Fuel supply unit
22a Combustor basket
30 Turbine
Dc Circumferential direction
Dr Radial direction
31 Casing
Ar Rotor axis
33 Turbine rotor
34 Rotor main body
35 Blade row
36 Blade
37 Blade main body
38 Platform
39 Blade root
40 Vane row
41 Vane
42 Vane main body
43 Outer shroud
45 Inner shroud
40a First vane row
41a First vane
421 Leading edge
44 Shroud main body
441 Gas path surface
46 Lateral wall
461 Lateral end face
424 Projection
50 Blade ring
52 Heat shield ring
60 Ring segment
G Combustion gas
Pg Combustion gas flow passage
7, 9 Seal member
C Cavity
70, 90 Main body part
71, 91 First protrusion
71a, 91a End face
71b, 71c, 91b, 91c Clearance forming portion
72, 92 Second protrusion
721, 921 Contact seal member 721a First seal surface
73, 93 Third protrusion
74, 94 Fourth protrusion
70a, 90a Second seal surface
80, 100 Cooling channel
80a, 100a Opening
801 Axial channel
802 Radial channel
80b, 100b Inflow port
81 First engaging part
82 Second engaging part
83 Slit
83a Slit bottom

The invention claimed is:

1. A seal member that is configured to be between a combustor that is disposed around a rotor axis and a vane that is disposed on a downstream side in an axial direction and define a part of a combustion gas flow passage through which combustion gas is configured to flow, the seal member being configured to seal a gap between the combustor and the vane, and the seal member comprising:
an end face that faces the downstream side in the axial direction so as to face a lateral end face of the vane facing an upstream side in the axial direction;
cooling channels through which cooling air is configured to be discharged toward the lateral end face of the vane from a plurality of openings defined in the end face of the seal member in an array in a circumferential direction based on the rotor axis; and
a clearance forming portion that protrudes further toward the downstream side in the axial direction than the end face of the seal member in which the openings are defined,
wherein:
a plurality of slits is recessed in a radial direction based on the rotor axis;
each of the plurality of slits is defined in a region adjacent to at least one of the plurality of openings;
each of the plurality of slits extends only partially into the seal member in the radial direction such that a respective end of each of the respective plurality of slits is located medially in the seal member in the radial direction; and
each of the plurality of slits is at a position sandwiched between the cooling channels in the circumferential direction when viewed from the radial direction such that only one of the plurality of slits is disposed between each adjacent pair of the cooling channels in the circumferential direction.

2. The seal member according to claim 1, wherein the seal member is configured to be further on an outer side than the combustion gas flow passage.

3. The seal member according to claim 1, wherein the cooling channels are defined in a region in the circumferential direction including a position on the upstream side in the axial direction at which the cooling channels are configured to face a leading edge of the vane that faces the upstream side in the axial direction.

4. The seal member according to claim 1, wherein the clearance forming portion is adjacent to at least one of the plurality of openings in the circumferential direction.

5. The seal member according to claim 1, further comprising:
a first engaging part configured to be connected to the combustor; and
a second engaging part located downstream of the first engaging part in the axial direction and configured to be connected to an annular projection of the vane that extends upstream from the lateral end face of the vane in the axial direction,
wherein:
the second engaging part has an annular seal surface configured to be between the second engaging part and the annular projection of the vane, and
a respective end of each of the respective plurality of slits defined on an outer side relative to the combustion gas flow passage is configured to be at a position closer to the combustion gas flow passage than a position at which the annular seal surface is defined.

* * * * *